US010550816B2

(12) United States Patent
Huh et al.

(10) Patent No.: US 10,550,816 B2
(45) Date of Patent: Feb. 4, 2020

(54) START/STOP SYSTEM FOR VEHICLES AND METHOD OF MAKING SAME

(71) Applicant: General Electric Company, Schenectady, NY (US)

(72) Inventors: Kum Kang Huh, Niskayuna, NY (US); Di Pan, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 391 days.

(21) Appl. No.: 15/045,754

(22) Filed: Feb. 17, 2016

(65) Prior Publication Data

US 2017/0234285 A1 Aug. 17, 2017

(51) Int. Cl.
*F02N 11/08* (2006.01)
*B60K 6/26* (2007.10)
*F02N 11/04* (2006.01)

(52) U.S. Cl.
CPC ............ *F02N 11/0803* (2013.01); *B60K 6/26* (2013.01); *F02N 11/04* (2013.01);
(Continued)

(58) Field of Classification Search
CPC .... F02N 11/0803; F02N 11/006; F02N 11/04; F02N 11/0814; F02N 11/0866;
(Continued)

(56) References Cited

U.S. PATENT DOCUMENTS 6,518,736 B2 * 2/2003 Sasaki .................... B60K 6/365
290/40 C
6,977,475 B2 * 12/2005 Kuribayashi ........... F02N 11/04
290/40 C
(Continued)

FOREIGN PATENT DOCUMENTS

| CN | 201975800 | * | 9/2011 | ................ H02J 3/38 |
| EP | 1 207 298 A2 | | 5/2002 | |
| EP | 1 489 294 A2 | | 12/2004 | |

OTHER PUBLICATIONS

Extended European Search Report and Opinion issued in connection with corresponding EP Application No. 17156019.6 dated Jul. 28, 2017.
(Continued)

*Primary Examiner* — Hung Q Nguyen
*Assistant Examiner* — Anthony Donald Taylor, Jr.
(74) *Attorney, Agent, or Firm* — Meagher Emanuel Laks Goldberg & Liao, LLP

(57) ABSTRACT

According to some embodiments, a start-stop system for a vehicle is disclosed. The start-stop system includes a first energy storage device coupled to a starter motor. The start-stop system also includes a first DC-to-AC inverter coupled to the first energy storage device, a starter/alternator coupled to the first DC-to-AC inverter, and a second DC-to-AC inverter coupled to the starter/alternator. The start-stop system further includes a second energy storage device coupled to the second DC-to-AC inverter. The start-stop system finally includes a controller configured to control the two DC-to-AC inverters such that either the starter motor or starter/alternator starts the vehicle based on the state of charge of the second energy storage device.

20 Claims, 6 Drawing Sheets

(52) U.S. Cl.
CPC .... *F02N 11/0866* (2013.01); *B60K 2006/268* (2013.01); *F02N 2011/0896* (2013.01); *F02N 2200/061* (2013.01)

(58) Field of Classification Search
CPC ....... F02N 2011/0896; F02N 2200/061; F02N 2300/2002; B60K 6/26; B60K 2006/268; H02J 7/1423; Y02T 10/48
USPC ..................................................... 123/179.4
See application file for complete search history.

(56) References Cited

U.S. PATENT DOCUMENTS

| | | | |
|---|---|---|---|
| 7,102,304 B2* | 9/2006 | Sebille | F02N 11/04 180/65.1 |
| 7,199,535 B2 | 4/2007 | Welchko et al. | |
| 7,294,984 B2* | 11/2007 | Urakabe | H02P 25/20 318/378 |
| 7,486,036 B2* | 2/2009 | Oyobe | B60L 7/22 310/76 |
| 7,764,051 B2* | 7/2010 | Ishikawa | B60K 6/26 322/29 |
| 7,839,013 B2* | 11/2010 | Nakamura | B60K 6/445 307/10.1 |
| 7,952,223 B2 | 5/2011 | Masson et al. | |
| 7,956,569 B2* | 6/2011 | Welchko | B60L 11/1868 318/105 |
| 8,002,056 B2* | 8/2011 | Chakrabarti | B60K 11/02 180/65.1 |
| 8,026,691 B2* | 9/2011 | Nagashima | B60L 11/005 180/65.1 |
| 8,054,032 B2* | 11/2011 | Chakrabarti | B60L 11/1868 180/65.1 |
| 8,058,830 B2* | 11/2011 | John | B60L 11/1868 318/107 |
| 8,122,985 B2* | 2/2012 | Nagashima | B60L 11/1881 180/65.275 |
| 8,248,010 B2* | 8/2012 | Mukai | B62D 5/0487 180/65.25 |
| 8,335,603 B2* | 12/2012 | Mitsutani | B60K 6/445 180/65.21 |
| 8,400,111 B2 | 3/2013 | Rainer et al. | |
| 8,415,824 B2 | 4/2013 | Chemin et al. | |
| 8,475,328 B2 | 7/2013 | Rouis et al. | |
| 8,528,689 B2* | 9/2013 | Uryu | B62D 5/0487 180/446 |
| 8,558,492 B2* | 10/2013 | Oh | B60L 11/1803 318/139 |
| 8,653,696 B2* | 2/2014 | King | B60L 11/123 307/82 |
| 8,786,116 B2* | 7/2014 | Hatanaka | B60L 3/003 290/10 |
| 8,847,555 B2* | 9/2014 | Loudot | B60L 11/1814 320/137 |
| 8,928,264 B2* | 1/2015 | Taniguchi | H02P 27/06 318/139 |
| 9,088,224 B2* | 7/2015 | Chen | H02M 3/155 |
| 9,124,207 B2* | 9/2015 | Hayashi | H02P 6/20 |
| 9,306,488 B2* | 4/2016 | Soh | H02P 27/08 |
| 9,780,702 B2* | 10/2017 | Li | H02P 5/74 |
| 2005/0002210 A1* | 1/2005 | Moon | B60L 11/14 363/37 |
| 2005/0100330 A1* | 5/2005 | Su | H02P 5/74 388/804 |
| 2006/0164028 A1* | 7/2006 | Welchko | B60L 15/025 318/105 |
| 2009/0033274 A1* | 2/2009 | Perisic | B60L 11/1868 318/771 |
| 2009/0090574 A1* | 4/2009 | Kuno | B60K 6/365 180/65.265 |
| 2009/0224720 A1* | 9/2009 | Oyobe | B60L 11/18 318/801 |
| 2009/0309537 A1* | 12/2009 | Saito | H02J 7/1415 320/101 |
| 2010/0236851 A1* | 9/2010 | Van Maanen | B60L 3/0046 180/65.265 |
| 2014/0024495 A1* | 1/2014 | Kim | B60K 6/52 477/167 |
| 2015/0217761 A1 | 8/2015 | Christman et al. | |

OTHER PUBLICATIONS

Di Pan, et al., "Extension of the Operating Region of an IPM Motor Utilizing Series Compensation", IEEE Transactions on industry Applications, vol. 50, No. 1, Jan./Feb. 2014, pp. 539-548.

* cited by examiner

START/STOP SYSTEM FOR VEHICLES AND METHOD OF MAKING SAME

FIELD OF THE INVENTION

Embodiments of the present invention relate generally to a start-stop system.

BACKGROUND OF THE INVENTION

A start-stop system automatically shuts down and restarts an engine in a vehicle while the vehicle is not in motion to reduce the amount of time the engine spends idling, thereby reducing fuel consumption and emissions. A start-stop system can be beneficial for vehicles which spend large amounts of time waiting at traffic lights or frequently come to stops in traffic jams. Start-stop systems are often found in conventional engine-driven vehicles or hybrid electric vehicles (HEV).

FIG. 1 illustrates a known start-stop system 100. Start-stop system 100 includes a main battery 102 connected to a secondary battery 104 through a DC/DC converter 106. The main battery 102 is connected to a starter motor 108 and an auxiliary load 110. The starter motor 108 is coupled to an engine 112. The secondary battery 104 is coupled to a generator motor 114 through a DC-to-AC inverter 116. The generator motor 114 is coupled to the engine 112.

Main battery 102 provides power to start motor 108 to start engine 112 from a cold start (i.e., after the user has turned off engine). Secondary battery 104 provides the necessary power for the generator motor 114 to start the engine 112 after a temporary stop. If there is insufficient charge in secondary battery 104 (e.g., providing 48 VDC), secondary battery 104 may be charged from main battery 102 (e.g., providing 12 VDC) via DC/DC converter 106.

In order for start-stop system 100 to function properly, additional circuitry may be required. For instance, a voltage stabilizer (not shown) may be necessary to maintain the voltage of the main battery 102 so that devices in the auxiliary load 110 can perform during start-stop operation. Furthermore, additional pre-charge and bypass circuits (not shown) may be required in order to store energy in the secondary battery 104. This arrangement adds cost to the system. Moreover, the DC/DC converter 106 is a conversion stage that may not provide sufficient power capability.

Thus, there is a need for a more efficient start-stop system.

SUMMARY OF THE INVENTION

According to some embodiments, a start-stop system for a vehicle is disclosed. The start-stop system includes a first energy storage device coupled to a starter motor. The start-stop system also includes a first DC-to-AC inverter coupled to the first energy storage device, a starter/alternator coupled to the first DC-to-AC inverter, and a second DC-to-AC inverter coupled to the starter/alternator. The start-stop system further includes a second energy storage device coupled to the second DC-to-AC inverter. The start-stop system finally includes a controller configured to control the two DC-to-AC inverters such that either the starter motor or starter/alternator starts the vehicle based on the state of charge of the second energy storage device.

According to some embodiments, a method of manufacturing a start-stop system for a vehicle is disclosed. The method includes coupling a first energy storage device to a starter motor; coupling a first DC-to-AC inverter to the first energy storage device; coupling a starter/alternator to the first DC-to-AC inverter; coupling a second DC-to-AC inverter to the starter/alternator; coupling a second energy storage device to the second DC-to-AC inverter; and configuring a controller to control the two DC-to-AC inverters such that either the starter motor or starter/alternator starts the vehicle based on the state of charge of the second energy storage device.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

Figure 2:
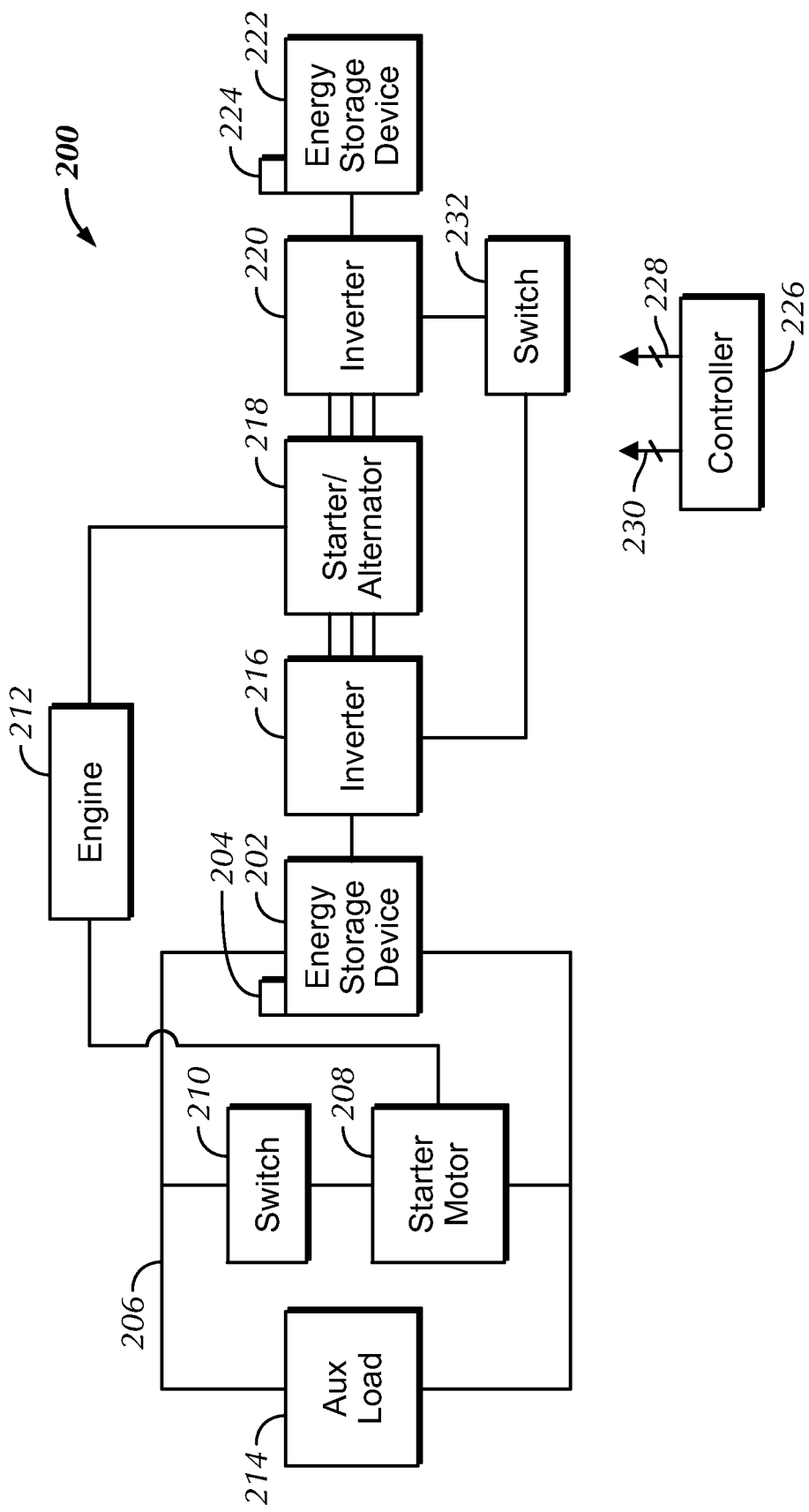
FIG. 2 is a block of a start-stop system in accordance with an embodiment of the invention.

FIG. 2 is a schematic diagram of a start-stop system 200 in accordance with an embodiment of the invention. According to various embodiments, start-stop system 200 is configured to be incorporated into various types of vehicles including, but not limited to, automobiles, busses, trucks, tractors, commercial and industrial vehicles such as mining and construction equipment, marine craft, aircrafts and off-road vehicles, including material transport vehicles or personal carrier vehicles, capable of operation both on the surface and underground such as in mining operations, or other types of electrical apparatuses such as a crane, elevator, or lift as non-limiting examples.

Start-stop system 200 includes a first energy storage device 202. According to various embodiments, first energy storage device 202 can be a battery, flywheel, fuel cell, an ultracapacitor, or a combination or ultracapacitors, fuel cells, and/or batteries, as examples. In one embodiment, first energy storage device 202 is a high specific-energy energy storage device such as a high specific energy battery or high energy density battery. The term energy battery used herein describes a high specific energy battery demonstrated to achieve a specific energy on the order of 100 W-hr/kg or greater (e.g., a lead acid, lithium-ion, sodium-metal halide, sodium nickel chloride, sodium-sulfur, lithium-air, or zinc-air battery). In a preferred embodiment, first energy storage device 202 is a 12 V lead acid battery.

A first sensor 204 is provided within start-stop system 200 to monitor and/or calculate the state-of-charge (SOC) of the first energy storage device 202. According to one embodiment, sensor 204 includes voltage and/or current sensors configured to measure the voltage and/or current of first energy storage device 202. While sensor 204 is shown coupled to first energy storage device 202 in FIG. 2, alternative embodiments may place sensor 204 elsewhere or have additional sensors placed elsewhere.

First energy storage device 202 is coupled via a DC bus 206 to a starter motor 208 and switch 210. In one embodiment, starter motor is used to start an engine, though in other embodiments, starter motor 208 may also provide traction. According to various embodiments, switch 210 may be, for example, a contactor or semiconductor switch.

Starter motor 208 is coupled to an engine 212. According to various embodiments, engine 212 may be an internal combustion gasoline engine, an internal combustion diesel engine, an internal combustion engine fueled by natural gas, an external combustion engine, or a gas turbine engine, as non-limiting examples. While not shown, starter motor 208 may be indirectly coupled to engine 212 through a transmission, which may be a gear assembly, belt assembly, or combination thereof according to various embodiments. In one embodiment, the transmission is configured as an electrically variable transmission (EVT) that couples the outputs of the starter motor 208 through an arrangement of interplanetary gears and clutches.

An auxiliary load 214 is coupled via DC bus 206 to first energy storage device 202. Auxiliary load 214 includes but is not limited to auxiliary systems such as heating, air-conditioning, radio, navigation, and other electronic equipment.

Figure 3:
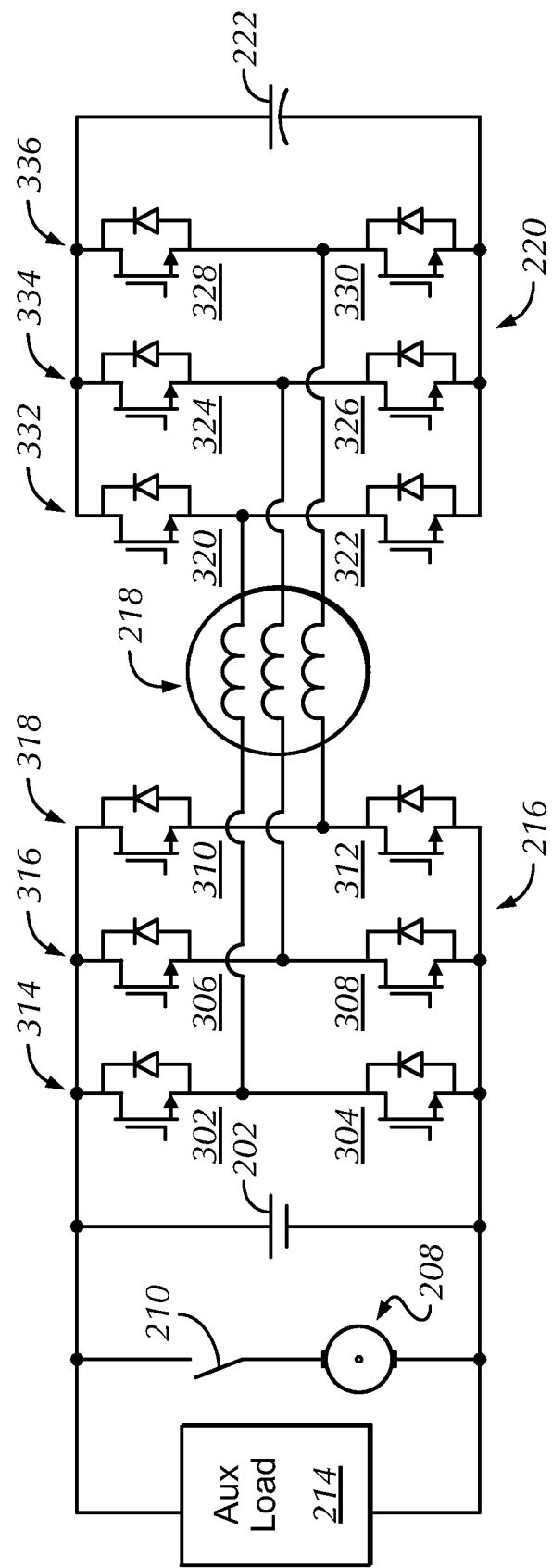
FIG. 3 is a schematic diagram of a configuration of two inverters and a starter/alternator in a start-stop system in accordance with an embodiment of the invention.
Figure 4:
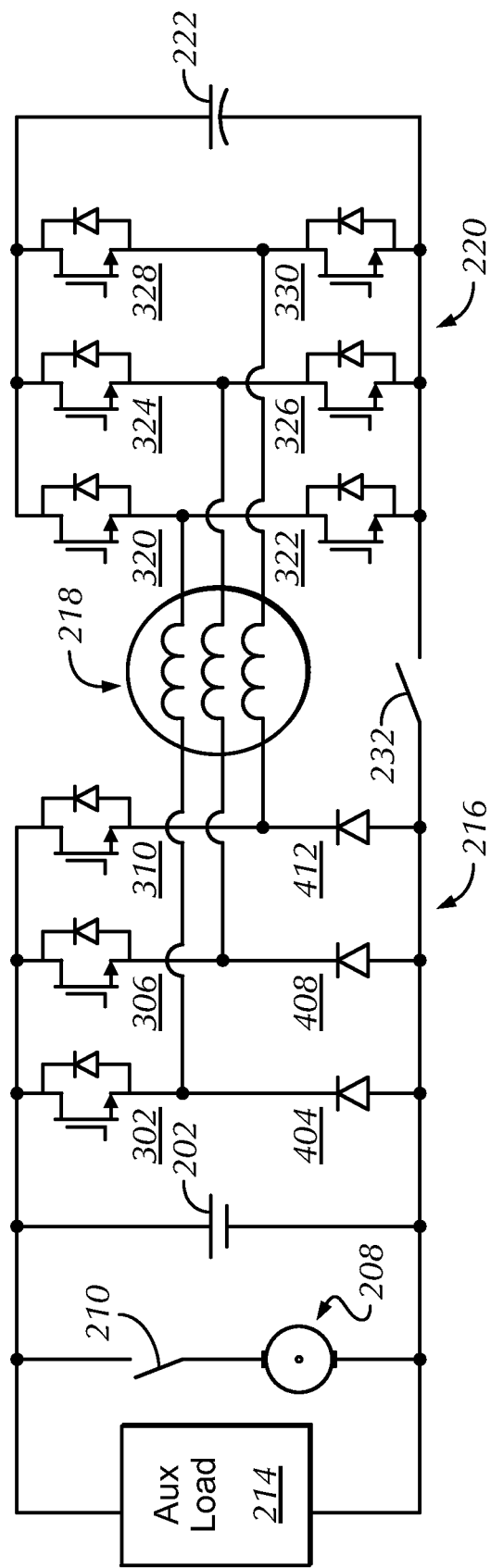
FIG. 4 is a schematic diagram of an alternative configuration of two inverters and a starter/alternator in a start-stop system in accordance with an embodiment of the invention.
Figure 5:
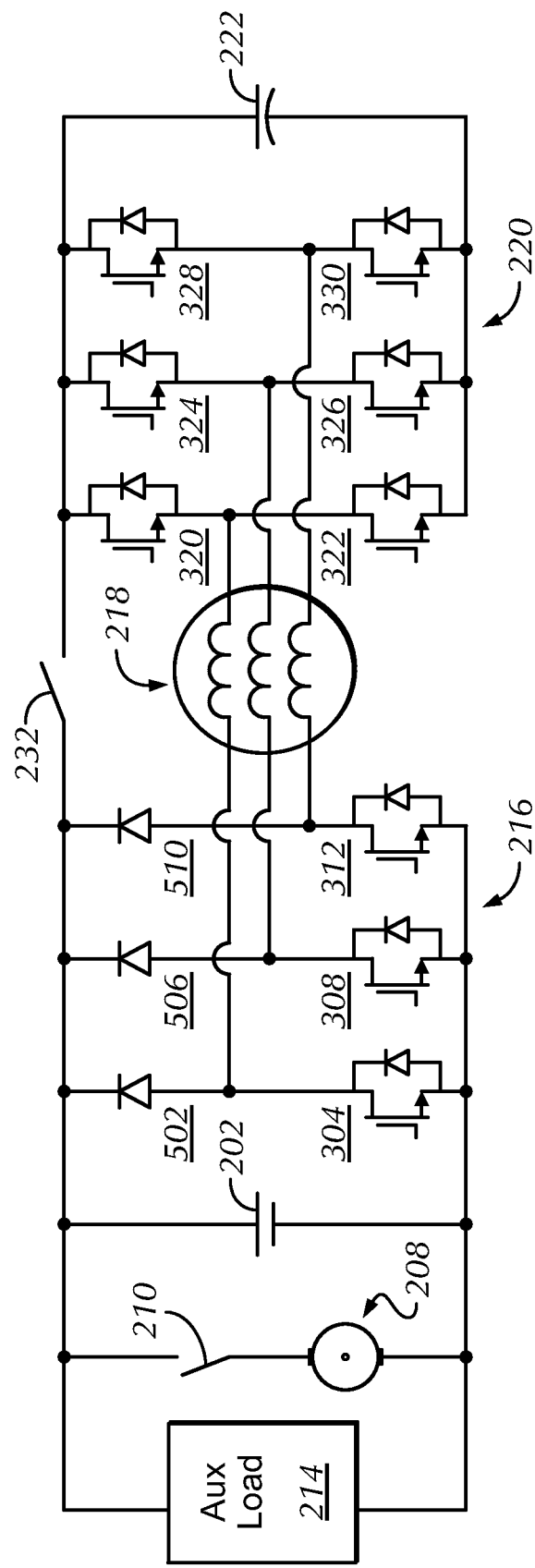
FIG. 5 is a schematic diagram of another alternative configuration of two inverters and a start/alternator in a start-stop system in accordance with an embodiment of the invention.

A bi-directional DC-to-AC inverter 216 is coupled to the first energy storage device 202, such as shown in FIGS. 3, 4, and 5. In the embodiment shown in FIG. 3, inverter 216 includes six half phase modules that are paired to form three phases. Each half phase module includes a switch coupled in antiparallel to a diode. Switches may be, for example, IGBTs, MOSFETs, SiC MOSFETs, GaN devices, BJTs, or MCTs. Inverter 216 is coupled to a starter/alternator 218 via a plurality of windings, where each winding is coupled to a respective phase of the inverter 216. The starter/alternator 218 is coupled to the engine 212. While not shown, the starter/alternator 218 may be indirectly coupled to engine 212 through a transmission, which may be a gear assembly, belt assembly, or combination thereof according to various embodiments. In one embodiment, the transmission is configured as an electrically variable transmission (EVT) that couples the outputs of the starter/alternator 218 through an arrangement of interplanetary gears and clutches.

The starter/alternator 218 is further coupled to a second bi-directional DC-to-AC inverter 220, such as shown in FIGS. 3, 4, and 5, via the plurality of windings. In one embodiment, inverter 220 includes six half phase modules that are paired to form three phases. Each half phase module includes a switch coupled in antiparallel to a diode. Switches may be, for example, IGBTs, MOSFETs, SiC MOSFETs, GaN devices, BJTs, or MCTs. Each winding of the starter/alternator 218 is coupled to a respective phase of the inverter 220.

Although the start-stop system 200 is described herein as including three phase inverters 216, 220 and a three phase starter/alternator 218, it is contemplated that any number of phases may be utilized in alternative embodiments.

Start-stop system 200 includes a second energy storage device 222 coupled to the second inverter 220. According to various embodiments, second energy storage device 222 can be a battery, a flywheel, fuel cell, an ultracapacitor, or a combination of ultracapacitors, fuel cells, and/or batteries, as examples. In one embodiment, second energy storage device 222 is a high specific-power energy storage device. For instance, second energy storage device 222 may be an ultracapacitor having multiple capacitor cells coupled to one another, where the capacitor cells may each have a capacitance that is greater than approximately 500 Farads. Alternatively, second energy storage device 222 may be a high power battery having a specific power of approximately 350 W/kg. Second energy storage device 222 may also be a combination of one or more ultracapacitors and batteries. In a preferred embodiment, second energy storage device 222 is an ultracapacitor nominally rated for 48 VDC.

A second sensor 224 may be included within start-stop system 200 to monitor and/or calculate the state-of-charge (SOC) of the second energy storage device 222. According to one embodiment, sensor 224 includes voltage and/or current sensors configured to measure the voltage and/or current of second energy storage device 222. While sensor 224 is shown coupled to second energy storage device 222 in FIG. 2, other embodiments may place sensor 224 elsewhere or have additional sensors placed elsewhere.

Start-stop system 200 includes a controller 226 coupled to the first and second inverters 216, 220 and switch 210 through control lines 228. Controller 226 is configured to control the half phase modules of first and second inverters 216, 220 to convert the DC voltage or current to an AC voltage or current for the starter/alternator 218. Controller 226 is also configured to control the half phase modules of first and second inverters 216, 220 to convert the AC voltage or current to a DC voltage or current for the first and second energy storage devices 202, 222. During operation, controller 226 also receives feedback from sensors 204, 224 via control lines 230. As one skilled in the art will recognize, additional sensors may be provided to permit controller 226 to monitor other operating conditions. For example, controller 226 may be coupled to the accelerator pedal to determine when it is desired to start the engine after a temporary stop. In addition, one skilled in the art will recognize that controller 226 may receive feedback from and/or transmit control commands to other components within start-stop system 200, such as, for example, engine 212 or switch 210.

Referring now to FIG. 3, a schematic diagram of the two inverters 216, 220 and the starter/alternator 218 is illustrated in accordance with an embodiment of the invention. In this embodiment, inverter 216 includes six half phase modules 302, 304, 306, 308, 310, and 312 that are paired to form three phase legs 314, 316, and 318. Each module 302-312 includes a power switch coupled in antiparallel with a diode. Similarly, inverter 220 includes six half phase modules 320, 322, 324, 326, 328, and 330 that are paired to form three phase legs 332, 334, and 336. Each module 320-330 comprises a power switch coupled in antiparallel with a diode. Phase leg 314 is coupled to a winding of starter/alternator 218 which is then coupled to phase leg 332. Phase leg 316 is coupled to a winding of starter/alternator 218 which is then coupled to phase leg 334. Phase leg 318 is coupled to a winding of starter/alternator 218 which is then coupled to phase leg 336.

Referring now to FIG. 4, a schematic diagram of an alternative configuration of the two inverters 216, 220 and the starter/alternator 218 is illustrated in accordance with an embodiment of the invention. In this embodiment, half phase modules 304, 308, and 312 are replaced with diodes 404, 408, and 412 respectively in order for inverter 216 to be a half-controlled converter.

Referring now to FIG. 5, a schematic diagram of another alternative configuration of the two inverters 216, 220 and the starter/alternator 218 is illustrated in accordance with an embodiment of the invention. In this embodiment, half phase modules 302, 306, and 310 are replaced with diodes 502, 506, and 510 respectively in order for inverter 216 to be a half-controlled converter.

Using a half-controlled converter, such as in FIG. 4 or 5, saves cost by removing some of the half phase modules, but at the expense of less controllability. For instance, current is not possible to conduct from the windings in starter/motor 218 through diodes 404, 408, and 412 to the negative terminal of the first energy storage device 202. During a starting mode, half phase modules 302, 306, and 310 are turned on and shorted, thus forming a neutral connection for the starter/alternator 218. During a generating mode, half-controlled converter 216 converts the generated AC power from the starter/alternator 218 into DC power to charge the first energy storage device 202. Here, the power flow from the starter/alternator 218 to the first energy storage device 202 is uni-directional. However, power flow between the starter/alternator 218 and second energy storage device 222 remains bi-directional because of the six half phase modules in inverter 220.

Referring back to FIG. 2, start-stop system 200 may optionally include switch 232 between inverters 216 and 220 in order to charge first energy storage device 202 with second energy storage device 222, or charge second energy storage device 222 with first energy storage device 202. In order to charge one energy storage device from the other energy storage device, switch 232 is closed which couples together the inverters 216 and 220. The starter/alternator 218 (used as an inductor here) and either inverter 216 or 220 form a multi-phase DC/DC converter. Thus, when the second energy storage device 222 does not have enough stored energy, the second energy storage device can be charged from the first energy storage device 202. Further, the second energy storage device 222 may also discharge energy into the first energy storage device 202. While not shown in FIG. 3, switch 232 may be coupled either between module 310 and 320, or between module 312 and 322. In FIG. 4, switch 232 may be coupled between diode 412 and module 322. In FIG. 5, switch 232 may be coupled between diode 510 and module 320. The amount of charging is controlled by controller 226 through on and off times.

Referring again to FIG. 2, when the engine 212 is in a cold condition, i.e. an initial start from the vehicle not being operated, the starter motor 208 will start the engine 212. In this situation, the auxiliary load 214 may not function because there may be insufficient power from energy storage device 202. This is due to the starter motor 208 drawing large amounts of power from first energy storage device 202, which causes the voltage to drop to a level where the auxiliary load 214 will not operate properly. As the vehicle is traveling, the starter/alternator 218 generates power from the engine 212 to supply the auxiliary load 214 and charge the first energy storage device 202 through the first inverter 216. The second energy storage device 222 is also charged via the starter/alternator 218 through the second inverter 220 to store enough energy for a starting operation after a temporary stop.

When the vehicle comes to a stop and the controller 226 commands the engine 212 to stop, the engine 212 will shut off if the energy in the second energy storage device 222 is charged sufficiently to start the engine 212 in the next starting operation. This sufficiency is based on the state of charge (SOC) of the second energy storage device 222, with at least the sensor 224. If the energy in the second energy storage device 222 is insufficient to start the engine 212 in the next starting operation, then the engine 212 will not stop. Engine 212 will continue to charge second energy storage device 222 until it has sufficient energy to start the engine 212. However, it is also possible to recharge the second energy storage device 222 from the first energy storage device 202 using two inverters 216, 220 with the windings of the starter/alternator 218 as DC/DC converters under the control of controller 226. Assuming the energy in the second energy storage device 202 is sufficient, the engine 212 will remain stopped until the controller 226 commands the engine 212 to start again. The auxiliary load 214 will continue to operate from the first energy storage device 202.

When the controller 226 commands the engine 212 to start, the second energy storage device 222 will provide power through the second inverter 220 in order to start the engine 212. The inverters 216, 220 are controlled so that all of the power required for the engine start will be delivered from the second energy storage device 222. The half modules in the inverter 216 are controlled by the controller 226 to be conducting. Since the inverter 216 is shorted, the inverter 220 provides power from the second energy storage device 222 to the starter/alternator 218. The first energy storage device 202 and auxiliary load 214 are not affected by the starting operation. Since the first energy storage device 202 is not providing power to start the engine 212, the voltage of the first energy storage device 202 remains relatively constant. As a result, the auxiliary load 214 will continue to operate during engine starting.

When traveling in the vehicle is complete, the energy stored in the second energy storage device 222 can be discharged to subsequently charge the first energy storage device 202. This will avoid wasting energy after the engine comes to a complete stop.

Figure 6:
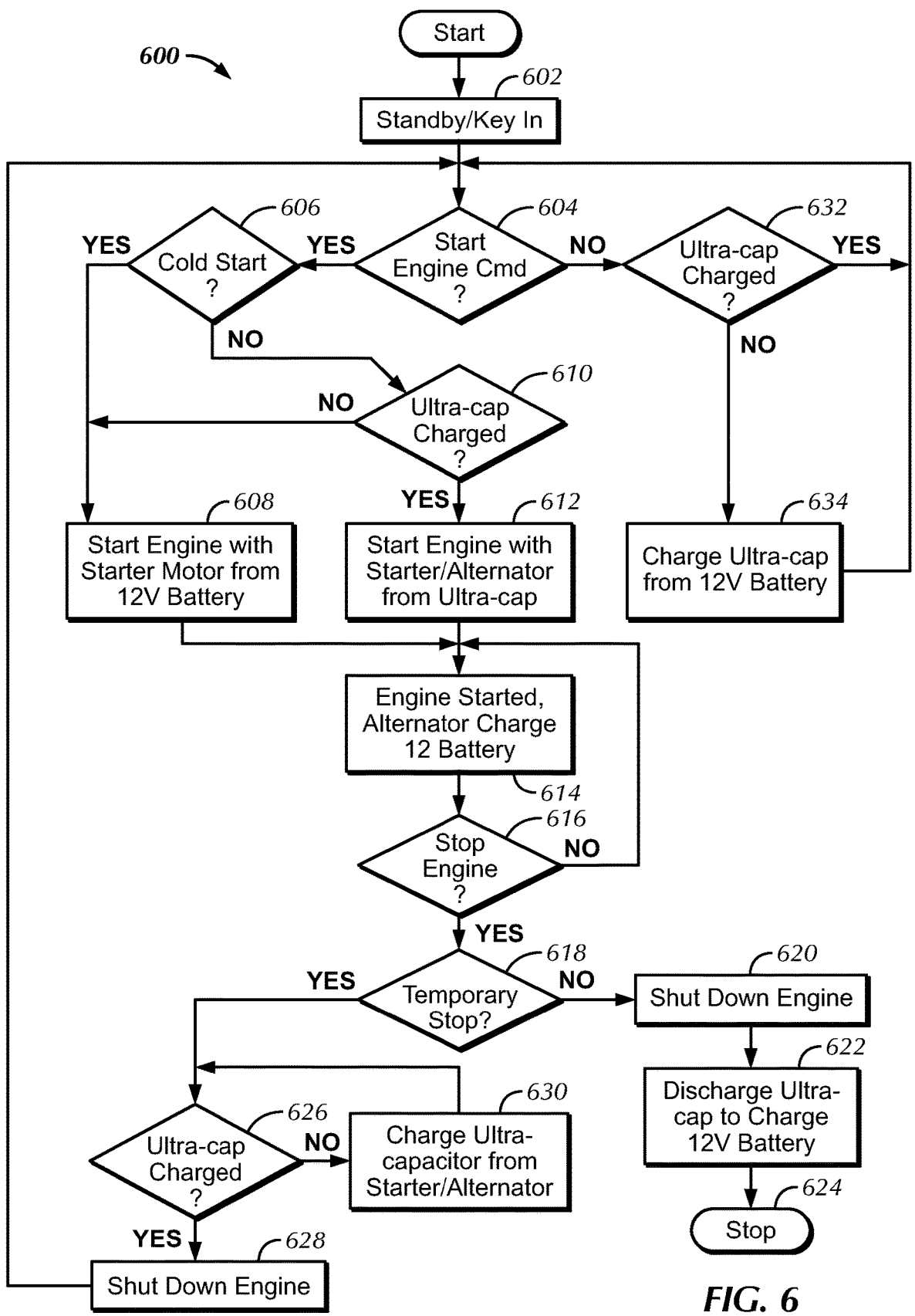
FIG. 6 is a flow chart showing operation of a start-stop system in accordance with an exemplary embodiment of the invention.

FIG. 6 illustrates a flow chart 600 showing operation of start-stop system 200 in accordance with an exemplary embodiment of the invention. In the explanation of the operation indicated in FIG. 6, it is assumed that first storage device 206 is a battery, e.g., nominally providing 12 VDC and second storage device 222 is an ultracapacitor, e.g., nominally rated for 48 VDC.

The start-stop system 200 begins at step 602 when a driver presses a standby button or inserts an ignition key to start the vehicle. At step 604, the controller 226 determines if a start command has been generated.

At step 606, the controller 226 determines whether the start is cold. If a cold start, then the engine 212 commences with the starter motor 208 using energy from the first energy storage device 202 at step 608. If the start is not cold, i.e. the driver made a temporary stop without turning off the vehicle, the controller 226 determines whether the second energy storage device 222 is charged sufficiently (based on state of charge) at step 610. If the second energy storage device 222 is not charged sufficiently, then the engine 212 starts from the starter motor 208 using energy from the first energy storage device 202 at step 608. If the second energy storage device 222 is sufficiently charged, then the engine 212 starts with the starter/alternator 218 using energy from the second energy storage device 222 at step 612. After the engine 212 is started and while the vehicle is driving at step 614, the starter/alternator 218 charges the first energy storage device 202.

When the vehicle comes to a stop at step 616, the controller 226 determines whether to stop the engine 212. This is based on whether the stop is temporary at step 618, for instance at a stop light or in a traffic jam. Whether a stop is temporary is determined based on whether a user has pressed the standby button to turn off the vehicle or removed the ignition key. If the stop is not temporary, then the controller 226 shuts down the engine 212 at step 620. The second energy storage device 222 is discharged into the first energy storage device 202 at step 622 and the vehicle is turned off at step 624. If the stop is temporary, then the controller 226 determines whether the second energy storage device 222 is sufficiently charged at step 626. If yes, then the engine 212 is shut down at step 628, restarting when the controller 226 commands the engine 212 to start again. If no, then the second energy storage device 222 is charged from the starter/alternator 218 driven by engine 212 at step 630, and then the engine 212 is shut down, restarting when the controller 226 commands the engine 212 to start again.

When the vehicle is on, but the engine is not started yet, the controller 226 determines if the second energy storage device 222 is charged at step 632 by examining its state of charge. If the second energy storage device 222 is charged, the controller 226 may return to step 604 to determine if a start command for the engine 212 has been generated. If the second energy storage device 222 is not charged, then at step 634, the first energy storage device 202 charges the second energy storage device 222. After, the controller 226 may return to step 604 to determine if a start command for the engine 212 has been generated.

During consistent driving, the starter/alternator 218 may charge the first energy storage device 202 and/or second energy storage device 222 by converting mechanical power into electric power and by controlling the inverters 216, 220 with controller 226. The controller 226 will adjust the voltage from the starter/alternator 218 by controlling the conduction times of the switches of the inverters 216, 220 to get a desired current and voltage, resulting in power from the starter/alternator 218 which may be used to charge both the first energy storage device 202 and second energy storage device 222.

The two inverters 216 and 220 are sized so that the current rating is the same throughout the start-stop system 200, which will be equal to the current rating of the starter/alternator 218. For the side with the first energy storage device 202, the voltage only needs to be sized for the second energy storage device 222 voltage. For the side with the second energy storage device 222, the voltage is sized by whatever is the allowable voltage for the second energy storage device 222.

Figure 1:
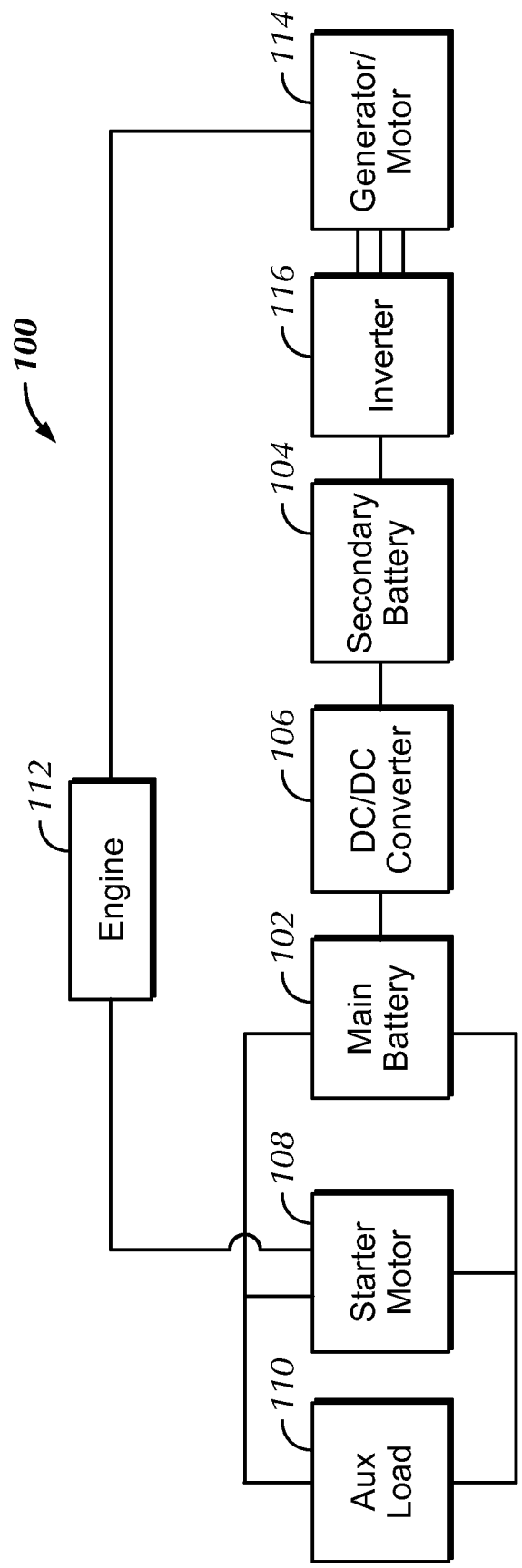
FIG. 1 is a block diagram of a conventional start-stop system.

Because both inverters 216, 220 are extracting power when the starter/alternator 218 is in a generating mode, there is no additional stage of power conversion to charge the first energy storage device 202 (as in conventional start-stop system 100 shown in FIG. 1). Moreover, efficiency of the start-stop system 200 can be improved by reducing conduction losses by using lower voltage rating devices on the side with first energy storage device 202. This is because the modules for both inverters 216 and 220 are sized for the voltage rating of the first energy storage device 202. In the prior embodiment of FIG. 1, the modules for the inverter 116 and DC/DC converter 106 were sized for the 48 V secondary battery. Further, unlike conventional start-stop systems using a DC/DC converter, such as start-stop system 100 shown in FIG. 1, the second energy storage device 222 can be charged through the starter/alternator 218 in a controlled manner without the need for an additional, costly pre-charge circuit.

A comparison of start-stop system 200 to conventional start-stop system 100 is reproduced in Table 1. In the table, $V_1$ is the voltage on the side with the second energy storage device 222 in the arrangement of FIG. 2 or secondary battery 104 in the arrangement of FIG. 1 and $V_2$ is the voltage on the side with the first energy storage device 202 or main battery 102. $I_m$ is the current for the starter/alternator 218 used in start-stop system 200, and $I_b$ is the current of the main battery 102 used in start-stop system 100. The difference of the total kVA rating between start-stop system 200 and start-stop system 100 is $3V_1 I_m - 2V_2 I_b$. Further, start-stop system 200 has a total active switch rating that is lower than conventional start-stop system 100 shown in FIG. 1. This is because the DC/DC converter modules in start-stop system 100 have to be sized for the 48 V secondary battery. With a reduced total active switch kVA rating, higher generating power can be achieved using the start-stop system 200. This is because both inverters 216, 220 extract power from the starter/alternator 218 at the same time.

TABLE 1

|  | Rating | Start-Stop System 200 | Start-Stop System 100 |
| --- | --- | --- | --- |
| Second ESD side (or secondary battery side) | voltage | $V_2$ | $V_2$ |
|  | current | $I_m$ | $I_m$ |
|  | kVA | $6*V_2*I_m$ | $6*V_2*I_m$ |
| First ESD side (or main battery side) | voltage | $V_1$ | $V_1$ |
|  | current | $I_m$ | $I_b$ |
|  | kVA | $3*V_1*I_m$ | $2*V_2*I_b$ |
| Total Active Switch | kVA | $(3*V_1 + 6*V_2)*I_m$ | $(2*I_b + 6*I_m)*V_2$ |
| Max Motoring Power | kW | $\sqrt{3/2}*V_2*I_m$ | $\sqrt{3/2}*V_2*I_m$ |
| Max Generating Power | kW | $\sqrt{3/2}*(V_1 + V_2)*I_m$ | $\sqrt{3/2}*V_2*I_m$ |
| Pre-charge Circuit | N/A | No | Yes |
| Additional Inductor | N/A | No | Yes |

It is understood that the above-described embodiments are only illustrative of the application of the principles of the present invention. The present invention may be embodied in other specific forms without departing from its spirit or essential characteristics. All changes which come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A start-stop system of a vehicle comprising:
   an engine mechanically coupled to a starter motor and a starter/alternator, the starter motor configured to start the engine during an initial starting operation, and the starter/alternator configured to start the engine after a temporary stop of the vehicle;
   a first energy storage device coupled to the starter motor;
   a first inverter coupled between the first energy storage device and the starter/alternator, the starter/alternator configured to charge the first energy storage device through the first inverter;

a second inverter coupled between the starter/alternator and a second energy storage device, the starter/alternator configured to charge the second energy storage device through the second inverter; and a controller configured to control the first and second inverters such that the starter/alternator is used to start the engine based on a state of charge of the second energy storage device, wherein during the temporary stop of the vehicle, the controller selectively:

commands the engine to shut off when the second energy storage device has a sufficient state of charge to start the engine via the starter/alternator in a subsequent starting operation; and commands the engine to charge the second energy storage device when the second energy storage device has an insufficient state of charge to start the engine via the starter/alternator in the subsequent starting operation.

2. The start-stop system of claim 1, further comprising a switching device coupled between the first and second inverters, the switching device configured to allow for charging between the first energy storage device and the second energy storage device.

3. The start-stop system of claim 1, further comprising a switching device coupled between the starter motor and the first energy storage device.

4. The start-stop system of claim 1, further comprising an auxiliary load coupled to the first energy storage device.

5. The start-stop system of claim 1, wherein the first energy storage device is a high specific-energy energy storage device and the second energy storage device is a high specific-power energy storage device.

6. The start-stop system of claim 1, wherein the two inverters each comprise six half-phase modules paired to form three phase legs.

7. The start-stop system of claim 1, wherein the first inverter comprises three phase legs, each phase leg comprising a half-phase module coupled to a diode such that the first inverter is a half-controlled converter.

8. The start-stop system of claim 1, wherein the vehicle is a hybrid electric vehicle.

9. The start-stop system of claim 1, further comprising at least one sensor to measure at least one of voltage and current of the second energy storage device.

10. A method for operating a start-stop system of a vehicle, the vehicle including an engine mechanically coupled to a starter motor and a starter/alternator, a first energy storage device coupled to the starter motor, a first inverter coupled between the first energy storage device and the starter/alternator, and a second inverter coupled between the starter/alternator and a second energy storage device, the method comprising:

starting the engine via the starter motor using energy from the first energy storage device during an initial starting operation;

controlling the first and second inverters such that the starter/alternator is used to start the engine based on a state of charge of the second energy storage device, and during a temporary stop of the vehicle, selectively:

shutting off the engine when the second energy storage device has a sufficient state of charge to start the engine via the starter/alternator in a subsequent starting operation; and charging the second energy storage device via the engine when the second energy storage device has an insufficient state of charge to start the engine via the starter/alternator in the subsequent starting operation.

11. The method of claim 10, wherein the vehicle further comprises at least one sensor to measure at least one of voltage and current of the second energy storage device.

12. The method of claim 10, wherein the vehicle further comprises a switching device coupled between the first and second inverters, the switching device configured to allow for charging between the first energy storage device and the second energy storage device.

13. The method of claim 10, wherein the vehicle further comprises a switching device coupled between the starter motor and the first energy storage device.

14. The method of claim 10, wherein the first energy storage device is a high specific-energy energy storage device and the second energy storage device is a high specific-power energy storage device.

15. The method of claim 10, wherein the vehicle is a hybrid electric vehicle.

16. A start-stop system of a vehicle comprising:

an engine mechanically coupled to a starter motor and a starter/alternator, the starter motor configured to start the engine during an initial starting operation, and the starter/alternator configured to start the engine after a temporary stop of the vehicle;

a first energy storage device coupled to the starter motor;

a first inverter coupled between the first energy storage device and the starter/alternator, the starter/alternator configured to charge the first energy storage device through the first inverter;

a second inverter coupled between the starter/alternator and a second energy storage device, the starter/alternator configured to charge the second energy storage device through the second inverter; and a controller configured to control the first and second inverters such that the starter/alternator is used to start the engine based on a state of charge of the second energy storage device, wherein during the temporary stop of the vehicle, the controller selectively:

commands the engine to shut off when the second energy storage device has a sufficient state of charge to start the engine via the starter/alternator in a subsequent starting operation; and commands the engine to charge the second energy storage device when the second energy storage device has an insufficient state of charge to start the engine via the starter/alternator in the subsequent starting operation, and wherein during a non-temporary stop of the vehicle, the controller commands the engine to shut off and allows the second energy storage device to charge the first energy storage device.

17. The start-stop system of claim 16, wherein the controller is further configured to selectively allow the first energy storage device to charge the second energy storage device during the initial starting operation.

18. The start-stop system of claim 16, further comprising a switching device coupled between the first and second inverters, the switching device configured to allow for charging between the first energy storage device and the second energy storage device.

19. The start-stop system of claim 16, further comprising a switching device coupled between the starter motor and the first energy storage device.

20. The start-stop system of claim 16, further comprising at least one sensor to measure at least one of voltage and current of the second energy storage device.

* * * * *